United States Patent
Cohrs et al.

[19]

[11] Patent Number: 5,942,134
[45] Date of Patent: Aug. 24, 1999

[54] FREQUENCY-CHANGING WELDING ARRANGEMENT

[75] Inventors: Reinhard Cohrs, Michelstadt; Thomas Klinger, Breuberg, both of Germany

[73] Assignee: Robert Bosch GmbH, Stuttgart, Germany

[21] Appl. No.: 08/864,859

[22] Filed: May 29, 1997

[30] Foreign Application Priority Data

May 29, 1996 [DE] Germany .......................... 196 21 526

[51] Int. Cl.[6] .................................................. B23K 11/24
[52] U.S. Cl. .......................................... 219/110; 363/142
[58] Field of Search .................................. 219/110, 111, 219/115; 363/79, 142, 143, 17

[56] References Cited

U.S. PATENT DOCUMENTS

| | | | |
|---|---|---|---|
| 4,656,571 | 4/1987 | Umezu | 363/143 |
| 4,709,132 | 11/1987 | Tengler et al. | |
| 4,748,550 | 5/1988 | Okado | 363/17 |
| 4,973,815 | 11/1990 | Ito et al. | 219/110 |
| 5,570,254 | 10/1996 | Spilger et al. | |
| 5,601,741 | 2/1997 | Thommes | 363/142 |

OTHER PUBLICATIONS

International Rectifier Company, "Semiconductor Databook" 1981/82m p. A–18.

*Primary Examiner*—Clifford C. Shaw
*Attorney, Agent, or Firm*—Venable; Norman N. Kunitz

[57] ABSTRACT

A converter welding arrangement with a welding control for the operation on mains with different voltages, having a welding transformer which is designed for operation on a mains with the lowest voltage of different possible voltages and to which the alternating voltage which is generated by AC conversion from the rectified mains voltage is supplied directly. A saturation monitoring arrangement monitors the current in the transformer and breaks off or interrupts the current supply to the welding transformer (18) when the current ($I_P$) flowing across the welding transformer (18) exceeds a threshold value ($I_T$)

10 Claims, 1 Drawing Sheet

FREQUENCY-CHANGING WELDING ARRANGEMENT

REFERENCE TO RELATED APPLICATIONS

This application claims the priority of German application No. 196 21 526.9, filed May 29, 1996, which is incorporated herein by reference.

BACKGROUND OF THE INVENTION

The invention relates to a welding arrangement as known, for example, from the publication "Semiconductor Databook", 1981/82, page A-18, of the INTERNATIONAL RECTIFIER company. In such a welding arrangement, and to facilitate smaller and lighter welding transformers, an alternating mains current is first rectified. Subsequently, an alternating voltage having a frequency that is higher than the mains frequency is again generated from the direct voltage by use of an inverter bridge circuit constructed with four power semiconductor devices. The alternating voltage is then fed to the primary winding of a welding transformer which reduces it to a desired welding voltage.

Known arrangements of the above type are designed to be used with a specific fixed mains voltage. As a rule, they can also be operated on mains with a voltage that is smaller than the specified fixed predetermined (designated) voltage. However, in principle, it is not readily possible to operate them on mains having voltages that are higher than the specific fixed designated operating voltage. The reason for this is, in particular, that the welding transformer, owing to its magnetic and material properties, does not allow a transfer of power higher than the maximum power that is designated for its intended use. In cases where a welding arrangement designed for a lower operating voltage is to be operated on a mains with a higher voltage, it is therefore customary to connect a pretransformer or a voltage-reducing device upstream of the mains rectifier to reduce the higher mains voltage to the lower designated mains voltage. This solution is technically easy and effective and it can be realized as a modular element. This solution, however, causes correspondingly higher costs and, most of all, increases the space requirement for the welding arrangement.

For a welding arrangement of the generic type, PCT published application No. WO 9308628 published Apr. 29, 1993, corresponding to U.S. Pat. No. 5,570,254 issued Oct. 28, 1996, discloses the monitoring of the welding transformer with respect to saturation. Thus, unusually strong current rises in the primary circuit of the transformer are intended to be detected early. It is the object of the early detection of such current rises to effectively protect the expensive power semiconductor devices, that are used for realizing the inverter bridge circuit, against destruction due to oversized currents in the primary circuit.

It is therefore the object of the present invention to provide a welding arrangement having a welding transformer that is demensioned to be as small as possible, which arrangement can be operated on mains with different higher voltages.

SUMMARY OF THE INVENTION

The above object generally is achieved according to a first aspect of the present invention by a frequency-converting welding circuit arrangement which comprises: a welding quality control circuit for operation of the arrangement on voltage mains having different voltages; a welding transformer designed for operation on a mains with a lowest voltage of the different possible voltages; a rectifier circuit for connection to a voltage mains for rectifying the mains voltage; an inverter circuit, which is controlled by the control circuit and is connected to the output of the rectifier circuit, for converting the rectified mains voltage to an AC voltage of a desired frequency and for directly supplying the AC voltage to a primary winding of the welding transformer; and, a saturation monitoring circuit arrangement which monitors the current flowing through the welding transformer and provides an output signal to the control circuit to cause interruption of the inverter circuit and of current supplied to the welding transformer when the current flowing across the welding transformer exceeds a threshold value ($I_T$). Preferably, the saturation monitoring circuit arrangement measures at least the current in the primary winding of the transformer, and utilizes the primary current ($I_P$) to determine whether to provide the output signal However, the saturation monitoring circuit arrangement may additionally measure the current in a secondary winding of the transformer and additionally utilize the secondary current ($I_S$) to determine whether to provide the output signal.

The above object is achieved according to a further aspect of the present invention by a method for operating a welding quality-controlled frequency changing welding circuit arrangement using a voltage mains having a voltage that exceeds the continuous rated voltage of the welding transformer, with the method comprising the steps of: applying an alternating voltage generated by AC conversion of a rectified mains voltage to a primary winding of the welding transformer; measuring a current flowing through the welding transformer; comparing the measured current to a predetermined threshold value ($I_T$) and, switching off the applied alternating voltage to the welding transformer if the measured current flowing through the welding transformer exceeds the threshold value ($I_T$). The step of measuring may include measuring only the current ($I_P$) flowing in the primary winding, but preferably includes additionally measuring the current in a secondary winding of the transformer and combining the measured secondary current ($I_S$) with the measured primary current to provide the measured current utilized during the step of comparing.

A welding arrangement according to the invention only requires a welding transformer which is dimensioned for the lowest of the possible mains voltages to be used. Operation at the higher voltages is made possible by the transformer saturation monitoring which is provided by the invention. The proposed arrangement offers the advantage that only a comparatively small and thus space-saving and economical transformer is needed. Additional arrangements or devices for reducing an increased mains voltage to the voltage for which the welding transformer is designed can be omitted in an advantageous manner. Due to the fact that it can be used for a wide range of mains voltages that exceed the continuous rated voltage of a welding transformer, the welding arrangement according to the invention allows a reduction of the required number of models of the welding arrangement for different operation voltages and thus again contributes to cutting costs.

An embodiment of a welding arrangement according to the invention is explained below in greater detail with reference to the drawing.

DETAILED DESCRIPTION OF THE PREFERRED EMBODIMENT

Figure 1:
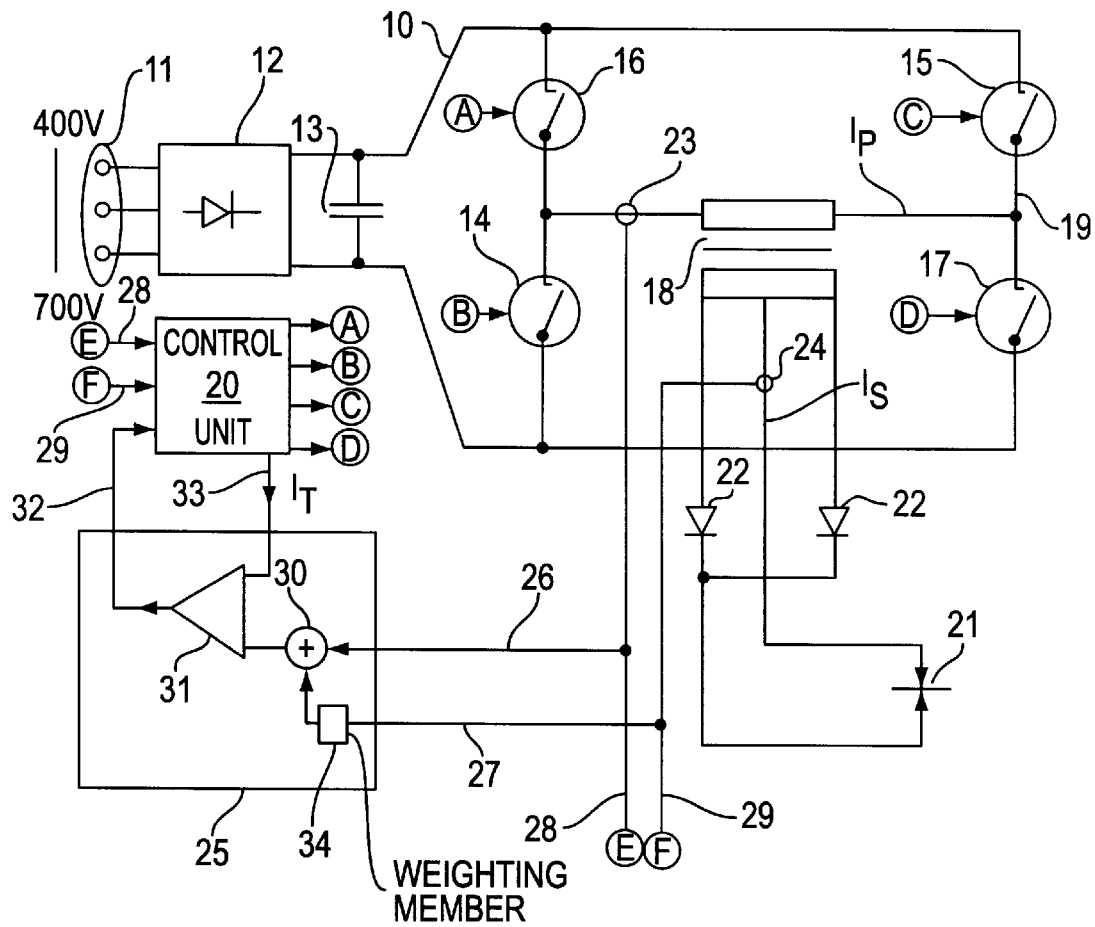
FIG. 1 is a schematic circuit diagram of a frequency-converting welding circuit arrangement according to the invention.

The welding circuit arrangement shown in FIG. 1 is based on a known frequency-converting welding circuit arrangement including a DC voltage intermediate circuit 10 which is connected via a rectifier 12 to a three-phase network 11. A capacitor 13 serves to smooth the direct voltage that is present in the intermediate or linking circuit 10. With the assistance of four-bridge-connected power circuit switches 14 to 17, a pulse-width-modulated alternating voltage of a desired frequency is generated from the direct voltage in the circuit 10, with the alternating voltage being applied to the input or primary winding of a welding transformer 18. The selective actuation of the power circuit switches 14 to 17 to produce the desired AC voltage is controlled by a welding control circuit 20.

On the secondary side of the welding transformer 18, a low-voltage alternating voltage is provided which, usually after having been rectified with diodes 22, is supplied to welding tongs or electrodes 21. With respect to its turns ratio, the welding transformer 18 is designed for operation with the lowest voltage of several possible voltage mains on which it is to be operated. With respect to its insulation strength, the welding transformer 18 must be adapted to the highest possible voltage mains operating voltage. For conventional transformers, whose insulation strength usually is at least ten times that of the indicated mains voltage, this is ensured without necessitating additional technical measures Until now, welding arrangements of the afore-described type are usually designed for the operation on mains with a fixed voltage of, for example, 400 volt. A specific dimensioning of the power circuit switches 14 to 17 as well as of the welding transformer 18 is a function of the desired welding currents. Since, for cost reasons alone, the welding transformer 18 is always precisely tuned or matched to an underlying mains voltage, it is not possible to operate the welding arrangement on mains having a higher voltage, and this is true, even when the energy amounts to be transferred do not increase during this process. A large number of conventional welding transformers can also be operated at voltages that are higher than the indicated continuous rated voltage if the duration of the voltage pulses to be transferred is shortened accordingly. Within the framework of a welding quality control, however control or adjustment interventions occur regularly which require an increased energy transfer in the form of a longer pulse duration at an elevated voltage. Such adjustment interventions inevitably lead to a saturation of the transformer and, as a consequence of the saturation, the current in the transformer primary circuit rises greatly and the power that is transferred via the transformer drops.

To overcome this difficulty, a monitoring of the saturation is carried out in the welding circuit arrangement according to the invention. In the alternating voltage-carrying primary circuit 19 of the welding transformer 18, as well as in the secondary circuit, respective current sensors 23, 24 are arranged to detect the primary current $I_P$ and the secondary current $I_S$, respectively. The measuring signals received via the current sensors 23 and 24 are supplied to a saturation monitoring circuit arrangement 25 via connecting lines 26 and 27 which are connected with the welding control 20 via two further signal paths 28 and 29, respectively. A current limit value $I_T$ is supplied to the saturation monitoring arrangement 25 via a further signal path 33. The saturation monitoring circuit arrangement 25 transmits an error signal to the welding control 20 via a further signal path 32 if a saturation has been detected. Advisably, a summing junction or circuit 30 is a component of the saturation monitoring circuit arrangement 25, which summing junction 30 adds the respective measuring signals present on lines 28 and 29 for the primary current $I_P$ and the secondary current $I_S$ preferably in a weighted manner. For this purpose a weighting member 34 is provided in the line 27. Downstream of the summing junction 30 is one input of a comparator 31, with the saturation threshold signal $I_T$ being fed to the second input of the comparator 30 via the line 33. The output of the comparator 31 is formed by the signal path 32 leading to the welding control 20. In a simplified design of the saturation monitoring circuit arrangement 25 without summing junction 30, the measuring signal for the primary current $I_P$ is fed directly to the comparator 31.

Figure 2:
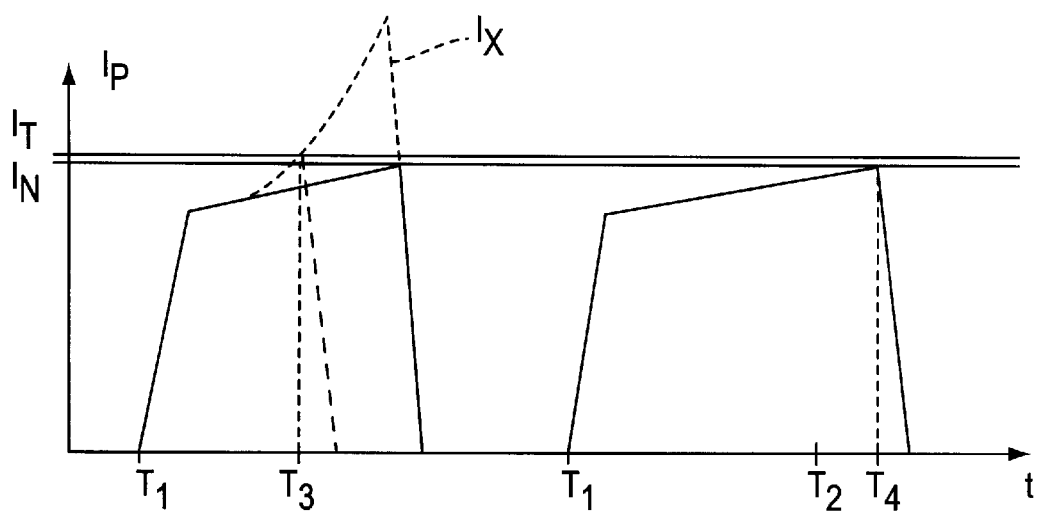
FIG. 2 illustrates current pulses in the transformer of the welding circuit arrangement of FIG. 1 used to explain the saturation detection according to the invention.

In order to detect a saturation condition, the fact is exploited that, in this case, the primary current $I_P$ rises above a maximum value $I_N$ reachable within the scope of a normal pulse applied to the primary winding of transformer 18, as is illustrated in FIG. 2, and demonstrates approximately the behavior shown by $I_X$ in FIG. 2. Therefore, a reference value $I_T$ is predetermined for the saturation monitoring circuit arrangement 25 by the welding control circuit 20, which reference value is just above the maximum current value $I_N$ that can be reached with normal pulses applied to the primary of the transformer 18. The saturation monitoring circuit arrangement 25 continuously compares the actual current values measured with the sensor 23 for the primary current $I_P$ with the reference circuit value $I_T$. If the value measured for the primary current $I_P$ reaches the reference value $I_T$, in FIG. 2 at the moment $T_3$, the saturation monitoring circuit arrangement 25 emits a warning signal to the welding control circuit 20 via the signal path 32. Based on the warning signal, the control circuit 20 then breaks off or interrupts the current pulse then in progress. A saturation effect which, nevertheless, might have occurred already is compensated for by the next current pulse of opposite polarity in that the pulse is extended beyond the intended switch-off moment $T_2$ until the current amplitude reaches the value of the threshold value $I_T$, i.e., at the moment $T_4$ in FIG. 2 On the basis of the developing flux of currents of opposite polarity of uneven length, the transformer is rebalanced magnetically. The procedure is repeated until the primary current $I_P$ no longer indicates saturation phenomena by prematurely reaching the current threshold value $I_T$.

To be able to better control, suppress or correct interference quantities, it is advisable to also integrate the value of the secondary current $I_S$ into the saturation monitoring. Advisably, this occurs such that the signals measured for the primary current $I_P$ and those measured in the secondary current $I_S$ are combined with a specific weighting ratio While adhering to the underlying concept, there is a wide design leeway in the implementation of the proposed welding circuit arrangement. Thus, the early detection of a saturation can be improved with regard to the response speed by evaluating time-derived signals instead of actual current signals $I_P$ and $I_S$. Accordingly, a maximum current rise value must then be specified as the threshold value. It is expedient to implement the saturation monitoring circuit arrangement 25 and welding control circuit 20 in one device. Of course, the specific signal processing circuit proposed in the illustrated embodiment for the saturation monitoring circuit arrangement 25 can also be replaced by another equivalent circuit. It was proven in a practical test that a welding circuit arrangement according to the invention with a welding transformer designed for the operation on a 400 V mains can be readily operated on a 700 V mains.

The invention now being fully described, it will be apparent to one of ordinary skill in the art that any changes and modifications can be made thereto without departing from the spirit or scope of the invention as set forth herein.

What is claimed:

1. A frequency-converting welding circuit arrangement comprising:

a welding quality control circuit for the operation of the arrangement on voltage mains-having different voltages;

a welding transformer designed for operation on a mains with a lowest voltage of the different possible voltages;

a rectifier circuit for connection to a voltage mains for rectifying the mains voltage;

an inverter circuit, which is controlled by the control circuit and is connected to the output of the rectifier circuits, for converting the rectified mains voltage to an AC voltage of a desired frequency and for directly supplying the AC voltage to a primary winding of the welding transformer; and, a saturation monitoring circuit arrangement which monitors the current flowing through the welding transformer and provides an output signal to the control circuit to cause interruption of the inverter circuit and of current supplied to the welding transformer when the current flowing across the welding transformer exceeds a threshold value ($I_T$).

2. A frequency converting welding circuit arrangement according to claim 1, wherein the saturation monitoring circuit arrangement measures the current in a primary winding of the transformer and utilizes the primary current ($I_P$) to determine whether to provide the output signal.

3. A frequency converting welding circuit arrangement according to claim 2, wherein the saturation monitoring circuit arrangement additionally measures the current in a secondary winding of the transformer and additionally utilizes the secondary current ($I_S$) to determine whether to provide the output signal.

4. A frequency converting welding circuit arrangement according to claim 3, wherein the saturation monitoring circuit arrangement includes means for combining the measured values for the primary current ($I_P$) and the secondary current ($I_P$) in a weighted manner to provide a combined value and for comparing the combined value with the threshold value ($I_T$) to provide the output signal.

5. A frequency converting welding circuit arrangement according to claim 4 wherein the means for combining is an adder.

6. A frequency converting welding circuit arrangement according to claim 1, wherein the threshold value has a value which is just above the maximum current value normally applied to the primary winding of the transformer.

7. A method for operating a welding quality-controlled frequency converting welding circuit arrangement using a voltage mains having a voltage that exceeds the continuous rated voltage of the welding transformer, said method comprising the steps of:

applying an alternating voltage generated by AC conversion of a rectified mains voltage directly to a primary winding of a welding transformer whose continuous rated voltage is less than the mains voltage;

measuring a current flowing through the welding transformer;

comparing the measured current to a predetermined threshold value ($I_T$); and switching off the applied alternating voltage to the welding transformer if the measured current flowing through the welding transformer exceeds the threshold value ($I_T$).

8. The method defined in claim 7 wherein the step of measuring includes measuring at least the current ($I_P$) flowing in the primary winding.

9. The method defined in claim 8, wherein the step of measuring additionally includes measuring the current in a secondary winding of the welding transformer, and combining the measured secondary current ($I_S$) with the measured primary current to provide the measured current utilized during the step of comparing.

10. The method defined in claim 7 wherein the threshold value has a value which is just above the maximum current value normally applied to the primary winding of the transformer.

* * * * *